United States Patent
Naitou et al.

(10) Patent No.: US 12,403,595 B2
(45) Date of Patent: Sep. 2, 2025

(54) ROBOT CONTROL DEVICE

(71) Applicant: FANUC CORPORATION, Yamanashi (JP)

(72) Inventors: Yasuhiro Naitou, Yamanashi (JP); Tomoyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 167 days.

(21) Appl. No.: 18/000,983

(22) PCT Filed: Jun. 18, 2021

(86) PCT No.: PCT/JP2021/023196
§ 371 (c)(1),
(2) Date: Dec. 7, 2022

(87) PCT Pub. No.: WO2021/261394
PCT Pub. Date: Dec. 30, 2021

(65) Prior Publication Data
US 2023/0211496 A1 Jul. 6, 2023

(30) Foreign Application Priority Data

Jun. 25, 2020 (JP) ................. 2020-109593

(51) Int. Cl.
*B25J 9/16* (2006.01)
(52) U.S. Cl.
CPC ............ *B25J 9/1651* (2013.01); *B25J 9/161* (2013.01); *B25J 9/1653* (2013.01)
(58) Field of Classification Search
None
See application file for complete search history.

(56) References Cited

U.S. PATENT DOCUMENTS

2015/0290809 A1* 10/2015 Nakagawa ............ B25J 13/085
700/258
2015/0352719 A1* 12/2015 Nakazato ........... G05B 19/4183
700/253

(Continued)

FOREIGN PATENT DOCUMENTS

| CN | 107081774 A | * | 8/2017 | ............ B25J 13/085 |
| CN | 108942915 A | * | 12/2018 | ............ B25J 9/1651 |

(Continued)

OTHER PUBLICATIONS

CN108942915A Description Translation Method for programming speed of cooperative robot Author: Wang et al. Date: Dec. 7, 2018 (Year: 2024).*

(Continued)

*Primary Examiner* — Khoi H Tran
*Assistant Examiner* — Trang Dang
(74) *Attorney, Agent, or Firm* — Studebaker Brackett PLLC

(57) ABSTRACT

Provided is a robot control device capable of easily setting a robot operation speed which is safe for an operator. The robot control device is equipped with: a selection unit for selecting a location of a human body; an allowed speed storage unit for associating and storing the location of the human body and the allowed speed for the robot at said location; and a robot control unit for retrieving the allowed speed associated with the location selected by the selection unit from the allowed speed storage unit, and setting the smallest value for the retrieved allowed speed as the maximum speed for the robot.

6 Claims, 5 Drawing Sheets

(56) References Cited

U.S. PATENT DOCUMENTS

| | | | | |
|---|---|---|---|---|
| 2016/0089790 | A1* | 3/2016 | Wang | B25J 9/1694 |
| | | | | 700/255 |
| 2018/0361578 | A1* | 12/2018 | Muneto | B25J 9/1605 |
| 2023/0067761 | A1* | 3/2023 | Spenninger | B25J 9/1633 |

FOREIGN PATENT DOCUMENTS

| | | | |
|---|---|---|---|
| JP | H10-264079 | A | 10/1998 |
| JP | 2008-137127 | A | 6/2008 |
| JP | 2014-094436 | A | 5/2014 |
| JP | 2015-526309 | A | 9/2015 |
| JP | 2015-230621 | A | 12/2015 |
| JP | 2020097091 | A * | 6/2020 |

OTHER PUBLICATIONS

JP2020097091A Description Translation Robot Interference Determination Device, Robot Interference Determination Method, Robot Control Device, Robot Control System, Human Movement Predictor, and Human Movement Prediction Method Author: Ning et al. Date: Jun. 25, 2020 (Year: 2024).*

CN 107081774 A Description Translation Title: Handshaking control method and system of robot Author: Jiang et al. Date: Aug. 22, 2017 (Year: 2025).*

CN108942915A Description Translation Title: "Method for programming speed of cooperative robot" Author: Wang et al. Date: Dec. 7, 2018 (Year: 2024).*

Falco, J. A., J. A. Marvel, and R. J. Norcross. "Collaborative robotics: Measuring blunt force impacts on humans." Chest 140.210 (2012): 45. Date: Oct. 12, 2012 (Year: 2025).*

CN108942915B—Description Translation Title: Method for programming speed of cooperative robot Author: Wang Peirui; Xia Shaoji; Lai Zhaoan; Huang Shizhong Date: Dec. 7, 2018 (Year: 2018).*

CN107081774A—Description Translation Title: Handshaking control method and system of robot Author: Jiang et al. Date: Aug. 22, 2017 (Year: 2017).*

M. J. Rosenstrauch and J. Krüger, "Safe human-robot-collaboration-introduction and experiment using ISO/TS 15066, " 2017 3rd International Conference on Control, Automation and Robotics (ICCAR), Nagoya, Japan, 2017, pp. 740-744, doi: 10.1109/ICCAR. 2017.7942795. (Year: 2017).*

International Search Report issued in PCT/JP2021/023196; mailed Aug. 17, 2021.

* cited by examiner

FIG. 4

| HUMAN BODY PART | PERMISSIBLE SPEED (mm/s) |
|---|---:|
| HEAD, NECK | 0 |
| LOWER LEGS | 250 |
| ARMS, HANDS, FINGERS | 700 |
| OTHER PARTS | 300 |

FIG. 5

| PART | SPEED (mm/s) | THRESHOLD (N) |
|---|---:|---:|
| LOWER LEGS | 250 | 150 |
| | 750 | 50 |
| | 1000 | 37 |
| ARMS | 250 | 450 |
| | 750 | 150 |
| | 1000 | 112 |

ROBOT CONTROL DEVICE

TECHNICAL FIELD

The present invention relates to a robot control device.

BACKGROUND ART

In recent years, a collaborative robot (a co-robot) has become popular, which detects contact with a human such as a worker or peripheral equipment by a sensor to stop or change movement so that the collaborative robot can operate while sharing a work space with the human (see, e.g., Patent Document 1). The robot described in Patent Document 1 predicts whether or not the robot contacts the human due to movement of the robot, and in a case where the contact has been predicted, limits movement of the robot so as not to contact a vital part of the human.

Patent Document 1: Japanese Unexamined Patent Application, Publication No. 2008-137127

DISCLOSURE OF THE INVENTION

Problems to be Solved by the Invention

For such a collaborative robot, from the viewpoint of safety, the movement speed of the robot needs to be set to a level that does not affect the body of the worker in a case where the collaborative robot comes into contact with the worker. For this reason, there has been a demand for a robot control device that can easily set a movement speed of the robot that is safe for the worker.

Means for Solving the Problems

A robot control device according to the present disclosure includes a selection unit that selects a part forming a human body, a permissible speed storage unit that stores the part forming the human body and a permissible speed of a robot corresponding to the part in association with each other, and a robot control unit that reads, from the permissible speed storage unit, the permissible speed associated with the part selected by the selection unit and sets the minimum value of the read permissible speed as the maximum speed of the robot.

Effects of the Invention

According to the present invention, the safe robot movement speed for the worker can be easily set.

BRIEF DESCRIPTION OF THE DRAWINGS

FIG. 4 is a view showing one example of a speed table; and

FIG. 5 is a view showing one example of a threshold table.

PREFERRED MODE FOR CARRYING OUT THE INVENTION

Figure 1:
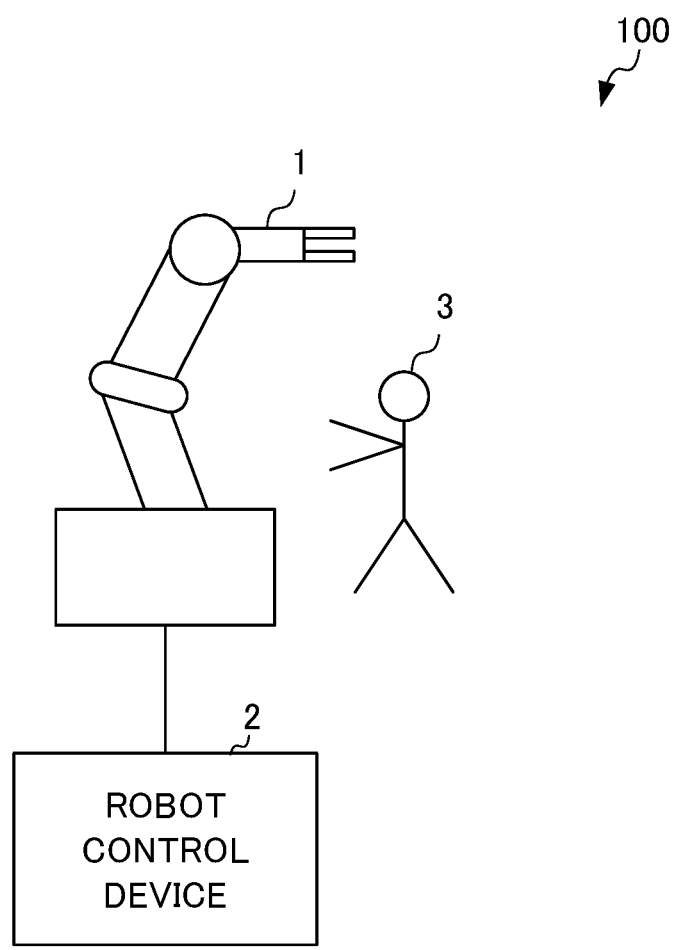
FIG. 1 is a view showing the outline of a robot system according to the present embodiment.

Hereinafter, an embodiment of the present invention will be described as one example. FIG. 1 is a view showing the outline of a robot system 100 according to the present embodiment. As shown in FIG. 1, the robot system 100 includes a robot 1 and a robot control device 2.

The robot 1 is a robot having an optional structure. The robot 1 may be, for example, a six-axis articulated robot. Moreover, the robot 1 is a robot that can work in cooperation with a worker 3. Such a robot that can work in cooperation with the worker 3 is called a collaborative robot.

Figure 2:
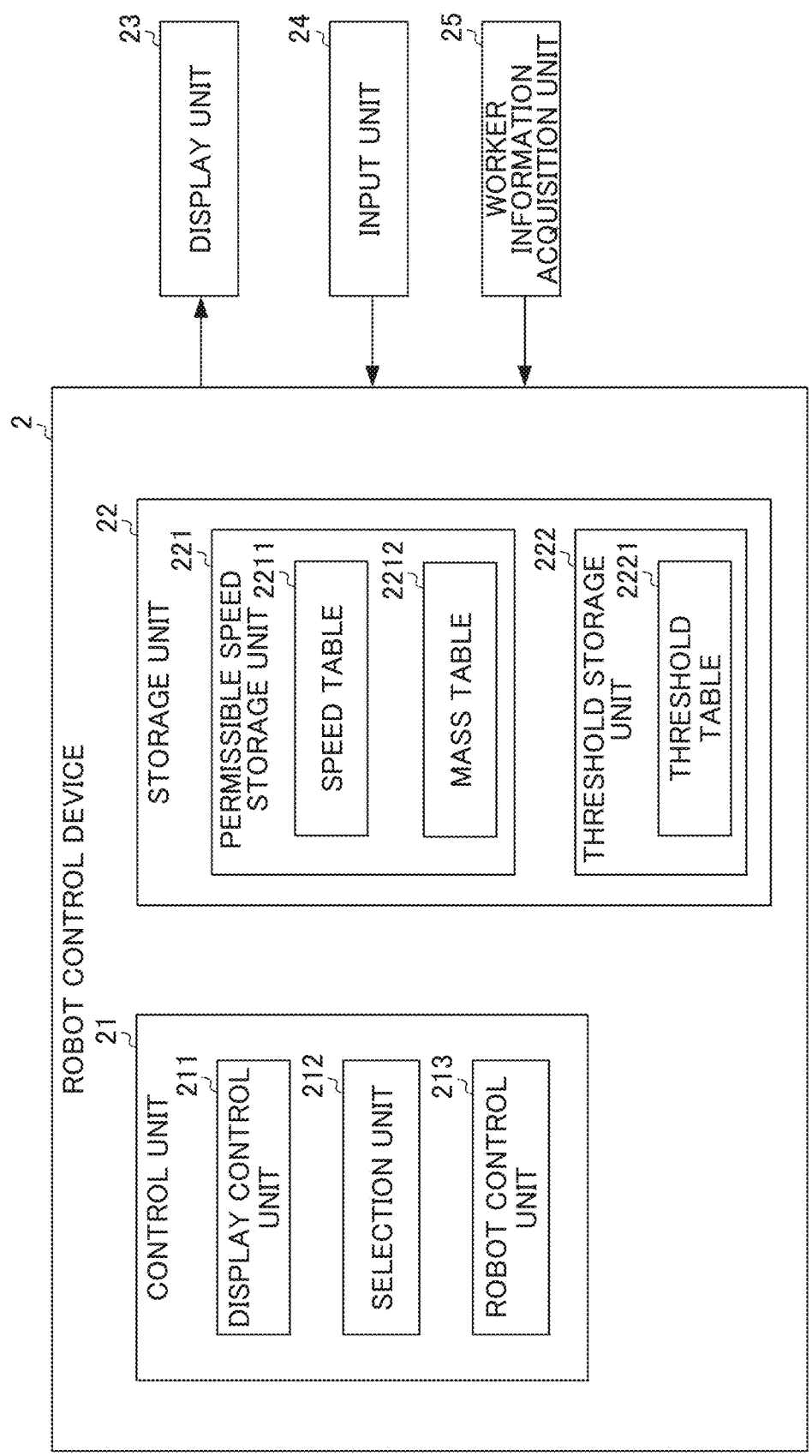
FIG. 2 is a diagram showing the outline of a robot control device according to the present embodiment.

The robot control device 2 is a control device that controls the robot 1 to perform predetermined movement, etc. FIG. 2 is a diagram showing the outline of the robot control device 2 according to the present embodiment. As shown in FIG. 2, the robot control device 2 includes a control unit 21, a storage unit 22, a display unit 23, an input unit 24, and a worker information acquisition unit 25.

The control unit 21 is a processor such as a central processing unit (CPU). The control unit 21 executes programs stored in the storage unit 22, thereby executing various types of processing. The control unit 21 includes a display control unit 211, a selection unit 212, and a robot control unit 213.

The storage unit 22 is a storage device such as a read only memory (ROM) or a random access memory (RAM) storing an operating system (OS), an application program, etc. or a hard disk drive or a solid state drive (SSD) storing various other types of information. The storage unit 22 has a permissible speed storage unit 221 and a threshold storage unit 222.

The display unit 23 includes, for example, a liquid crystal display, and displays various types of information. The input unit 24 includes, for example, a button, a key, and a switch, and receives various types of operation input from the worker. Note that the display unit 23 and the input unit 24 may be a teaching operation panel having, e.g., an integrated touch panel. The teaching operation panel may include a tablet terminal.

The worker information acquisition unit 25 acquires worker information on the worker 3 present within a movement area of the robot 1. The worker information described herein includes information indicating that a part forming the body of the worker 3 is present in the movement area of the robot 1.

Specifically, the worker information acquisition unit 25 has an imaging device such as a camera, and acquires the worker information by capturing an image of the worker 3 by the imaging device.

The worker 3 may carry a wireless terminal that can transmit a wireless signal with a predetermined frequency, and the worker information acquisition unit 25 may be a wireless device that can receive the wireless signal transmitted from the wireless terminal. In this case, the worker information acquisition unit 25 receives the wireless signal transmitted from the wireless terminal, thereby acquiring the worker information.

Next, the processing of the robot control device 2 according to the present embodiment will be described. The display control unit 211 displays, on the display unit 23, first image information indicating a model of parts forming a human body and second image information for selecting a body part.

Figure 3:
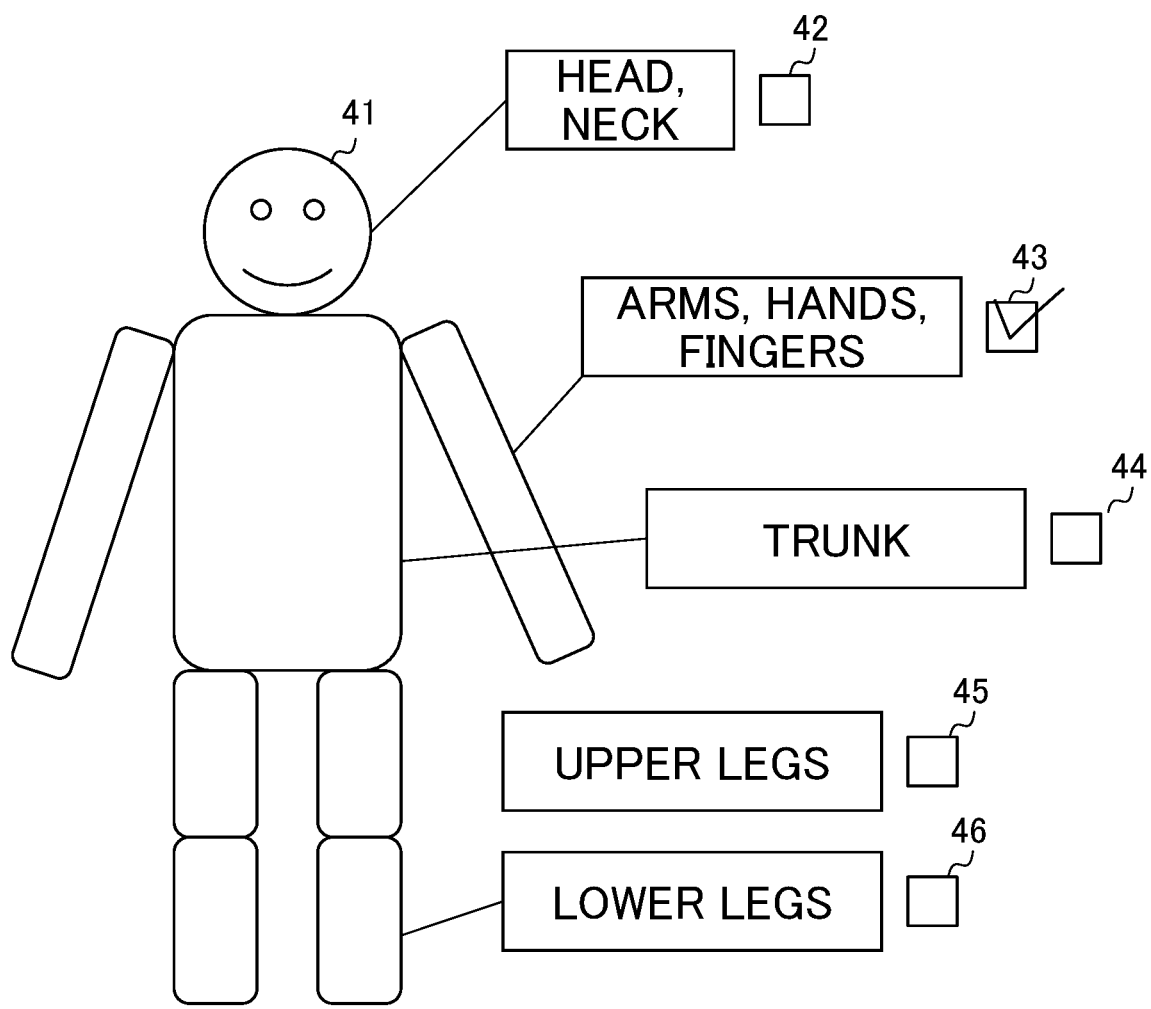
FIG. 3 is a view showing one example of first image information and second image information.

FIG. 3 is a view showing one example of the first image information and the second image information. For example, as shown in FIG. 3, the display control unit 211 displays, on the display unit 23, first image information 41 indicating a model of parts forming a human body. Moreover, the display control unit 211 displays, on the display unit 23, checkboxes 42 to 46 for selecting each part forming the human body as the second image information.

More specifically, the display control unit 211 displays, on the display unit 23, the checkbox 42 for selecting the head and neck of the human body, the checkbox 43 for selecting the arms, hands, and fingers, the checkbox 44 for selecting the trunk, the checkbox 45 for selecting the upper legs, and the checkbox 46 for selecting the lower legs.

Note that instead of the first image information and the second image information as described above, the display control unit 211 may display, on the display unit 23, a list for selecting each part forming a human body or an input box for inputting and specifying a part name, for example.

The selection unit 212 selects the part forming the human body. Specifically, by checking at least one of the checkboxes 42 to 46 as shown in FIG. 3 by means of, e.g., the input unit 24, the selection unit 212 selects the part forming the human body. In the example shown in FIG. 3, by checking the checkbox 43, the selection unit 212 selects the arms, hands, and fingers of the human body.

The permissible speed storage unit 221 stores a speed table 2211 showing an association between the part forming the human body and the permissible speed of the robot 1 corresponding to such a part forming the human body. Note that the permissible speed of the robot 1 is the movement speed at which the robot 1 can move without causing damage to each part of the human body if the robot 1 were to contact such a part of the human body.

FIG. 4 is a view showing one example of the speed table 2211. In the example shown in FIG. 4, the permissible speed of the robot 1 corresponding to the head and the neck is 0 (mm/s), the permissible speed of the robot 1 corresponding to the lower legs is 250 (mm/s), the permissible speed of the robot 1 corresponding to the arms, the hands, and the fingers is 700 (mm/s), and the permissible speed of the robot 1 corresponding to other human body parts (e.g., the trunk and the upper legs) is 300 (mm/s).

The robot control unit 213 reads, from the speed table 2211 in the permissible speed storage unit 221, the permissible speed associated with the human body part selected by the selection unit 212. The robot control unit 213 sets, as the maximum speed of the robot 1, the minimum value of the permissible speed read from the speed table 2211.

Specifically, in a case where the arms and the trunk are selected by the selection unit 212, the robot control unit 213 reads the permissible speeds associated with the arms and the trunk from the speed table 2211. As shown in FIG. 4, in the speed table 2211, the permissible speed of the robot 1 corresponding to the arms is 700 (mm/s), and the permissible speed of the robot 1 corresponding to the trunk (the other human body parts) is 300 (mm/s). Thus, the robot control unit 213 sets, as the maximum speed of the robot 1, 300 (mm/s) which is the minimum value of the permissible speeds read from the speed table 2211.

The input unit 24 may receive input of the weight and height of the worker 3 sharing a work area with the robot 1. The robot control unit 213 calculates the permissible speed of the robot 1 corresponding to the human body part based on the input weight and height. Then, the robot control unit 213 stores the calculated permissible speed of the robot 1 in the speed table 2211 in the permissible speed storage unit 221.

Contact force upon contact between the robot 1 and the human body originates mainly from the speed of the robot 1, the mass of each human body part, and the elastic constant (the spring constant) of the human body. There is not much individual difference in the elastic constant (the spring constant), but there is an individual difference in the mass of the human body part. For these reasons, the permissible speed of the robot 1 is calculated using experimental data or simulation with a calculator.

The calculated permissible speed of the robot 1 is associated with each part forming the human body, and is stored as a mass table 2212 in the permissible speed storage unit 221. That is, the mass table 2212 stores the mass of the part forming the human body and the permissible speed of the robot 1 in association with each other.

The robot control unit 213 calculates the mass of each part of the worker 3 based on the weight of the worker input via the input unit 24 and a general composition ratio of each part of the human body. Note that the robot control unit 213 may add a certain value (a margin) to the input weight of the worker, considering the safety of the worker 3.

Then, the robot control unit 213 refers to the mass table 2212, thereby obtaining the permissible speed corresponding to the calculated mass of each part of the worker 3. The robot control unit 213 stores, as the speed table 2211, the obtained permissible speed and each part of the worker 3 in association with each other.

The robot control device 2 may create a sample database (not shown) stored with plural pieces (e.g., for thousands of people) of sample data including the height, weight, and each part mass of the worker, and may store the created database in the storage unit 22. When the height and weight of the worker are input via the input unit 24, the robot control unit 213 may refer to the sample database, thereby calculating, as the mass of each part of the worker, each part mass corresponding to a value closest to the input height and weight.

Also in this case, the robot control unit 213 refers to the mass table 2212, thereby obtaining the permissible speed corresponding to the calculated mass of each part of the worker 3. The robot control unit 213 stores, as the speed table 2211, the obtained permissible speed and each part of the worker 3 in association with each other.

In a case where the worker information acquisition unit 25 has acquired the worker information, the robot control unit 213 reads, from the permissible speed storage unit 221, the permissible speed associated with the human body part selected by the selection unit 212. Then, the robot control unit 213 sets the minimum value of the read permissible speed as the maximum speed of the robot 1.

Specifically, the worker information acquisition unit 25 acquires the worker information indicating that the part forming the body of the worker 3 is present within the movement area of the robot 1, and the selection unit 212 selects the part forming the human body. For example, in a case where the worker information acquisition unit 25 has the imaging device, the worker information acquisition unit 25 captures the image of the worker by the imaging device, thereby acquiring the worker information.

In a case where the worker information acquisition unit 25 is the wireless device that can receive the wireless signal transmitted from the wireless terminal, the worker information acquisition unit 25 receives the wireless signal transmitted from the wireless terminal, thereby acquiring the worker information.

The robot control unit 213 reads the permissible speeds associated with the arms and the head from the speed table 2211. As shown in FIG. 4, in the speed table 2211, the permissible speed of the robot 1 corresponding to the head is 0 (mm/s), and the permissible speed of the robot 1 corresponding to the arms is 700 (mm/s). Thus, the robot control unit 213 sets, as the maximum speed of the robot 1, 0 (mm/s) which is the minimum value of the permissible speeds read from the speed table 2211. That is, the robot control unit 213 stops the robot 1.

In a case where the worker information includes the information indicating that the part of the worker 3 is present within the movement area of the robot 1, the robot control unit 213 reads, from the speed table 2211, the permissible speed associated with the part of the worker in the worker information acquired by the worker information acquisition unit 25, and sets the minimum value of the read permissible speed as the maximum speed of the robot 1.

Specifically, the worker information acquisition unit 25 acquires the worker information including the information indicating that the arms and lower legs of the worker 3 are present within the movement area of the robot 1. For example, in a case where the worker information acquisition unit 25 has the imaging device, the worker information acquisition unit 25 acquires the worker information by capturing an image, which includes the arms and the lower legs, of the worker by the imaging device.

In this case, the robot control unit 213 reads the permissible speeds associated with the arms and lower legs of the worker 3 from the speed table 2211. In the speed table 2211 shown in FIG. 4, the permissible speed of the robot 1 corresponding to the arms is 700 (mm/s), and the permissible speed of the robot 1 corresponding to the lower legs is 250 (mm/s). Thus, the robot control unit 213 sets, as the maximum speed of the robot 1, 250 (mm/s) which is the minimum value of the permissible speeds.

In a case where the worker information does not include the information indicating that the part of the worker 3 is present within the movement area of the robot 1, i.e., a case where the worker 3 is not present within the movement area of the robot 1, the robot control unit 213 sets, as the maximum speed of the robot 1, a value (e.g., 750 (mm/s)) greater than the permissible speed in the speed table 2211, for example.

The threshold storage unit 222 stores a threshold table 2221 showing an association among the part forming the human body, the movement speed of the robot 1, and a threshold for contact force when the robot 1 contacts the part forming the human body.

FIG. 5 is a view showing one example of the threshold table 2221. In the example shown in FIG. 5, for the lower legs in the threshold table 2221, the threshold is 150 (N) in the case of a movement speed of 250 (mm/s), is 50 (N) in the case of a movement speed of 750 (mm/s), and is 37 (N) in the case of a movement speed of 1000 (mm/s).

For the arms in the threshold table 2221, the threshold is 450 (N) in the case of a movement speed of 250 (mm/s), is 150 (N) in the case of a movement speed of 750 (mm/s), and is 112 (N) in the case of a movement speed of 1000 (mm/s).

The robot control unit 213 reads, from the threshold table 2221, the contact force threshold associated with the part selected by the selection unit 212 and the movement speed of the robot 1 input via the input unit 24. Then, the robot control unit 213 sets the minimum value of the read contact force threshold as a threshold for stopping the robot 1.

Specifically, in a case where the parts selected by the selection unit 212 are the lower legs and the arms and the movement speed of the robot 1 input via the input unit 24 is 250 (mm/s), the robot control unit 213 reads, as the contact force thresholds, 150 (N) and 450 (N) from the threshold table 2221. Then, the robot control unit 213 sets, as the threshold for stopping the robot 1, 150 (N) which is the minimum value of the read contact force thresholds. Thus, the robot control unit 213 stops movement of the robot 1 when the contact force, if contact were to occur between the robot 1 and the worker 3, reaches a stop threshold of 150 (N) or greater.

The robot control unit 213 reads, from the threshold table 2221, the movement speed of the robot 1 associated with the part selected by the selection unit 212 and the contact force threshold input via the input unit 24. The robot control unit 213 sets the minimum value of the read movement speed of the robot 1 as the maximum movement speed of the robot 1.

Specifically, in a case where the parts selected by the selection unit 212 are the lower legs and the arms and the contact force threshold input via the input unit 24 is 150 (N), the robot control unit 213 reads, from the threshold table 2221, 250 (mm/s) and 750 (mm/s) as the movement speeds of the robot 1. Then, the robot control unit 213 sets, as the maximum movement speed of the robot 1, 250 (mm/s) which is the minimum value of the read movement speeds of the robot 1.

As described above, according to the present embodiment, the robot control device 2 includes the selection unit 212 that selects the part forming the human body, the permissible speed storage unit 221 that stores the part forming the human body and the permissible speed of the robot 1 corresponding to such a part in association with each other, and the robot control unit 213 that reads the permissible speed associated with the part selected by the selection unit 212 from the permissible speed storage unit 221 and sets the minimum value of the read permissible speed as the maximum speed of the robot 1.

As described above, the robot control device 2 sets the minimum value of the permissible speed of the robot 1 as the maximum speed of the robot 1, and therefore, a safe movement speed for the worker 3 working in cooperation with the robot 1 can be easily set.

The robot control device 2 further includes the display control unit 211 that displays, on the display unit 23, the first image information 41 indicating a model representation of the human body parts and the checkboxes 42 to 46 as the second image information for selecting the part. With this configuration, the robot control device 2 can suitably select each human body part having the possibility of contacting the robot 1.

The robot control device 2 further includes the input unit 24 that receives input of the weight and height of the worker 3 sharing the work area with the robot 1. The robot control unit 213 calculates the permissible speed of the robot 1 corresponding to the part based on the weight and height of the worker 3, and stores the calculated permissible speed of the robot 1 in the speed table 2211 in the permissible speed storage unit 221. With this configuration, the robot control device 2 can calculate the permissible speed in consideration of the height and weight of the worker 3.

The robot control device 2 further includes the worker information acquisition unit 25 that acquires the worker information on the worker present within the movement area of the robot 1. In a case where the worker information acquisition unit 25 has acquired the worker information, the robot control unit 213 reads, from the speed table 2211, the permissible speed associated with the part selected by the selection unit 212. Then, the robot control unit 213 sets the minimum value of the read permissible speed as the maximum speed of the robot 1.

With this configuration, in a case where the worker information has been acquired, i.e., a case where the worker 3 is present around the robot 1, the robot control device 2 sets the minimum value of the permissible speed as the maximum speed of the robot 1. Thus, in a case where the worker 3 is present around the robot 1, the robot control device 2 can easily set the safe movement speed for the worker 3 working in cooperation with the robot 1.

The worker information includes the information indicating that the part of the worker 3 is present within the movement area of the robot 1, and in a case where the worker information includes the information indicating that the part of the worker 3 is present within the movement area of the robot 1, the robot control unit 213 reads, from the speed table 2211, the permissible speed associated with the part of the worker 3 in the worker information acquired by the worker information acquisition unit 25. Then, the robot control unit 213 sets the minimum value of the read permissible speed as the maximum speed of the robot 1. With this configuration, in a case where the part of the worker 3 is present within the movement area of the robot 1, the robot control device 2 can easily set the safe movement speed for the worker 3 working in cooperation with the robot 1.

The robot control device 2 further includes the threshold table 2221 storing the part forming the human body, the movement speed of the robot 1, and the threshold for the contact force, the contact force being a force arising in a case where contact occurs between the robot 1 and the part in association with each other. The robot control unit 213 reads, from the threshold table 2221, the contact force threshold associated with the part selected by the selection unit 212 and the movement speed of the robot 1 input via the input unit 24. Then, the robot control unit 213 sets the minimum value of the read contact force threshold as the threshold for stopping the robot 1. With this configuration, the robot control device 2 can set a safe threshold for stopping the robot 1 for the worker 3 working in cooperation with the robot 1.

The robot control unit 213 reads, from the threshold table 2221, the movement speed of the robot 1 associated with the part selected by the selection unit 212 and the contact force threshold input via the input unit 24. Then, the robot control unit 213 sets the minimum value of the read movement speed of the robot 1 as the maximum movement speed of the robot 1. With this configuration, the robot control device 2 can set a safe maximum movement speed of the robot 1 for the worker 3 working in cooperation with the robot 1.

The embodiment of the present invention has been described above, but the above-described robot control device 2 can be implemented by hardware, software, or a combination thereof. Moreover, the control method performed by the above-described robot control device 2 can also be implemented by hardware, software, or a combination thereof. Implementation by the software as described herein means implementation by reading and execution of a program by a computer.

The program can be stored using various types of non-transitory computer readable media and be supplied to the computer. The non-transitory computer readable media include various types of tangible storage media. Examples of the non-transitory computer readable media include magnetic recording media (e.g., a hard disk drive), magnetic optical recording media (e.g., a magnetic optical disk), a CD-read only memory (CD-ROM), a CD-R, a CD-R/W, and semiconductor memories (e.g., a mask ROM, a programmable ROM (PRPM), an erasable PROM (EPROM), a flash ROM, and a random access memory (RAM)).

Each embodiment described above is a preferred embodiment of the present invention, but is not intended to limit the scope of the present invention only to each embodiment above. Various changes can be made without departing from the gist of the present invention.

EXPLANATION OF REFERENCE NUMERALS

1 Robot
2 Robot Control Device
3 Worker
21 Control Unit
22 Storage Unit
23 Display Unit
24 Input Unit
25 Worker Information Acquisition Unit
211 Display Control Unit
212 Selection Unit
213 Robot Control Unit
221 Permissible Speed Storage Unit
222 Threshold Storage Unit
2211 Speed Table
2221 Threshold Table

The invention claimed is:

1. A robot control device comprising:
a processor; and
a memory;
wherein the processor is configured to:
    select a part forming a human body;
    store the part forming the human body and a permissible speed of a robot corresponding to the part in association with each other in the memory, wherein the permissible speed of the robot is a movement speed at which the robot can move without causing damage to each part of the human body if the robot were to contact such a part of the human body;
    store the part forming the human body and a threshold for contact force in association with each other, wherein the contact force being a force arising in a case where contact occurs between the robot and the part forming the human body;
    read, from the memory, the permissible speed associated with the selected part forming the human body;
    set a minimum value of the read permissible speed as a maximum speed of the robot, wherein the maximum speed of the robot is a limit value of the fastest speed at which the robot can operate;
    receive input of weight and height of a worker sharing a work area with the robot;
    calculate the permissible speed of the robot corresponding to the part forming the human body based on the weight and the height, and store the calculated permissible speed of the robot in the memory; and
    read, from the memory, the contact force threshold associated with the selected part forming the human body and the movement speed of the robot, set a minimum value of the read contact force threshold as a threshold for stopping the robot, and operate and stop the robot based on the maximum speed of the robot and the threshold for stopping the robot.

2. The robot control device according to claim 1, wherein the processor displays, on a display unit, first image information indicating a model of the part forming the human body and second image information for selecting the part forming the human body.

3. The robot control device according to claim 1, wherein the processor acquires worker information on the worker present within a movement area of the robot,
wherein in a case where the processor has acquired the worker information, the processor reads, from the memory, the permissible speed associated with the selected part forming the human body, and sets the minimum value of the read permissible speed as the maximum speed of the robot.

4. The robot control device according to claim 1, wherein the processor acquires worker information on the worker present within a movement area of the robot,
   wherein the worker information includes information indicating that the part of the worker is present within the movement area of the robot, and
   wherein in a case where the worker information includes the information indicating that the part of the worker is present within the movement area of the robot, the processor reads, from the memory, the permissible speed associated with the part of the worker in the acquired worker information, and sets the minimum value of the read permissible speed as the maximum speed of the robot.

5. The robot control device according to claim 1, wherein the processor reads, from the memory, the movement speed of the robot associated with the selected part forming the human body and the contact force threshold, and sets the minimum value of the read movement speed of the robot as the maximum speed of the robot.

6. A robot control device comprising:
   a processor; and
   a memory;
   wherein the processor is configured to:
      select a part forming a human body;
      store the part forming the human body and a permissible speed of a robot corresponding to the part forming the human body in association with each other, wherein the permissible speed of the robot is a movement speed at which the robot can move without causing damage to each part of the human body if the robot were to contact such a part of the human body;
      store the part forming the human body and a threshold for contact force in association with each other, wherein the contact force being a force arising in a case where contact occurs between the robot and the part forming the human body;
      acquire, from the memory, the permissible speed associated with the selected part forming the human body and set a maximum speed of the robot based on the permissible speed, the maximum speed of the robot is a limit value of the fastest speed at which the robot can operate;
      receive input of weight and height of a worker sharing a work area with the robot;
      calculate the permissible speed of the robot corresponding to the part based on the weight and the height, and store the calculated permissible speed of the robot in the memory; and
      read, from the memory, the contact force threshold associated with the selected part forming the human body and the movement speed of the robot, set a minimum value of the read contact force threshold as a threshold for stopping the robot, and operate and stop the robot based on the maximum speed of the robot and the threshold for stopping the robot.

* * * * *